March 8, 1966  R. P. PRICE  3,239,756
INSTRUMENT DIAL PRINTER WHICH PRINTS A PARTICULAR DIAL
FOR A PARTICULAR INSTRUMENT BY READING DISCRETE
INSTRUMENT POINTER EXCURSIONS
AND PRINTING DISCRETE DIAL
INDICIA ACCORDINGLY
Filed Aug. 17, 1961
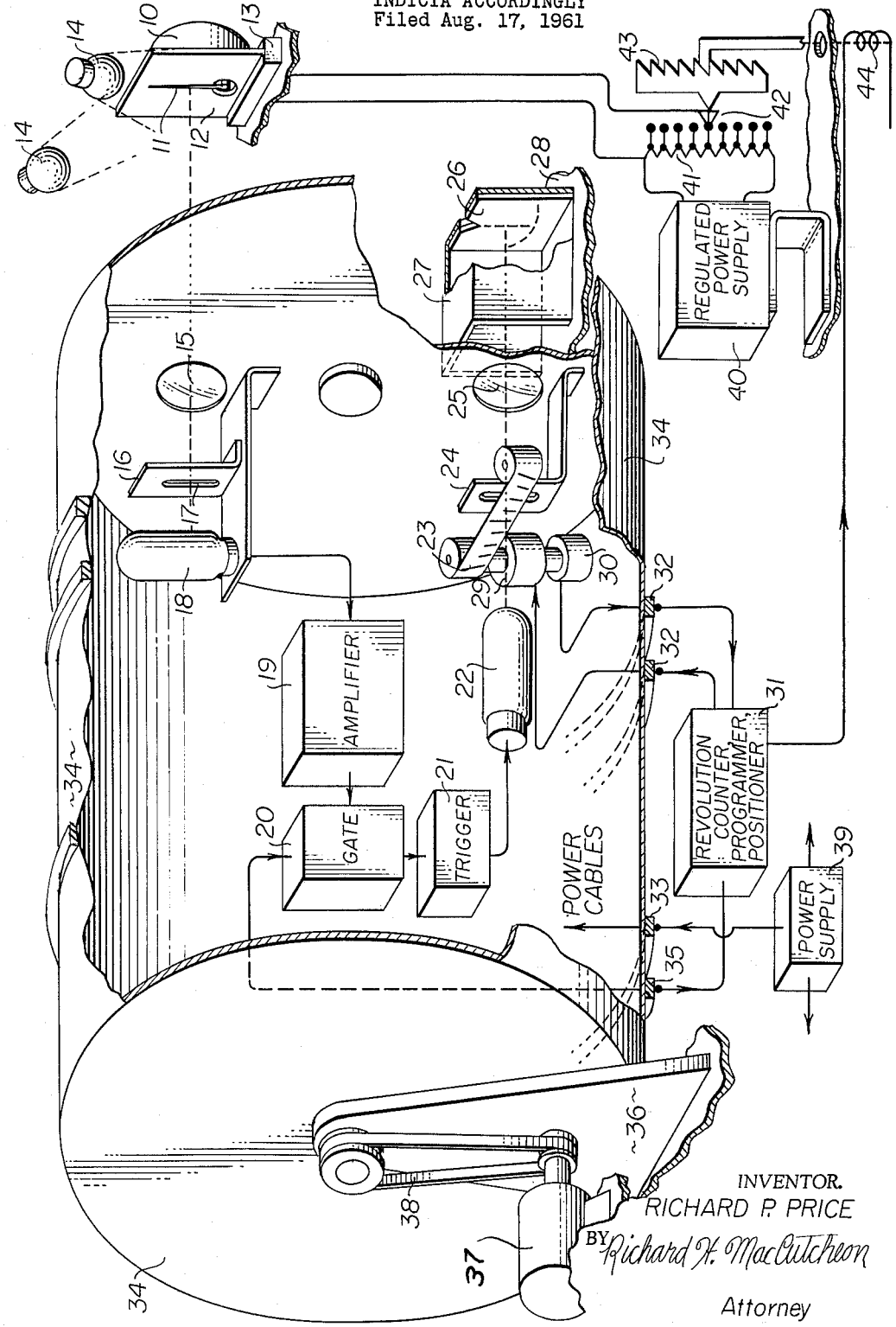
INVENTOR.
RICHARD P. PRICE
BY Richard H. MacCutcheon
Attorney United States Patent Office 3,239,756
Patented Mar. 8, 1966

3,239,756
INSTRUMENT DIAL PRINTER WHICH PRINTS A PARTICULAR DIAL FOR A PARTICULAR INSTRUMENT BY READING DISCRETE INSTRUMENT POINTER EXCURSIONS AND PRINTING DISCRETE DIAL INDICIA ACCORDINGLY
Richard P. Price, Parma Heights, Ohio, assignor, by mesne assignments, to API Instruments Company, Chesterland, Ohio, a corporation of Ohio
Filed Aug. 17, 1961, Ser. No. 132,207
5 Claims. (Cl. 324—74)

This invention relates to apparatus and methods for the manufacture of electrical indicating instruments, for example of the type which have a pointer co-operating with a marked dial plate for reading when assembled.

In the past the tracking characteristics of electrical indicating instruments have not been sufficiently reproducible or predictable from instrument to instrument. For mass production, accuracy of reading has ofttimes been sacrificed in order to enjoy the economy of preprinted dials. For higher quality instruments, however, it has been necessary to hand calibrate and individually mark each separate graduation for the dial of each instrument.

Heretofore it has been known to automatically print a dial plate of photosensitive material by printing graduations and/or legend characters one at a time, for example as described in U.S. Patents 2,300,803—Pattee, and 2,767,375—Schramm. With such prior art, however, awkward arrangements have been required in order to synchronize movement of a mask (so as to not print non-selected parts of the photosensitive material) with successive deflections of the needle, and these arrangements have been expensive or greatly subject to error, or both.

An object of the present invention is to provide simple and inexpensive means for overcoming the above difficulties.

Other objects and advantages will become apparent and the invention may be better understood from consideration of the following description taken in connection with the accompanying drawings, in which the single figure is a simplified schematic diagram of apparatus appropriate for practicing one form of the invention.

In the drawing an electric quantity indicating meter movement 10 has a pointer 11 and during the calibration process is temporarily supplied with a blank white dial plate 12. As illustrated this assembly is mounted on a support 13 which is relatively stationary. The blank dial plate 12 is generally illuminated from the front as by light sources 14, and an image of the plate and pointer is focused through a lens 15 onto a mask 16 having a slit 17 through which a portion of the image travels to a photoelectric cell 18.

When the projected image of the pointer 11 passes across the slit 17 it produces an electrical pulse in the output from the photo cell 18 which is sent to amplifier 19 and amplified signal from 19 passes through a gate 20 at such times as the gate is opened as hereinafter explained and the output of the gate 20 goes to trigger unit 21 which fires a flash tube 22. The light output of the flash tube 22 is projected through transparent portions of a preprinted film 23 and proportionally through a slit in a mask 24 and through a focusing lens 25 onto a relatively stationary photosensitive material dial plate 26 which is shown shielded by a light trap 27. As shown, dial plate 26 and housing 27 are mounted on a relatively stationary member 28. The preprinted film 23 is controlled by a positioning motor 29 and its relative position with respect to the axis of the light being projected from flash tube 22 is signalled by a transducer 30. Signals to the motor 29 and from the transducer 30 are communicated from and to a programmer 31 as by means of slip rings 32 and relatively stationary brushes. Those in the art will recognize that in the simplified diagram the lines depicted with arrows represent signal flow and not necessarily the required connections or flow of current therein.

In accordance with the illustrated embodiment all items numbered from 15 through 25 and items 29 and 30 are mounted inside and rotate continuously with a drum 34 which carries the slip rings 32 and one or more additional slip rings 33 and a short sector switch element 35. The drum 34, shown part cut away, is journalled for rotation with respect to pedestal supports such as 36 and is driven by a motor 37 by a transmission means such as a belt 38. The entire apparatus is provided with a common power supply, or group of power supplies 39. There is also a carefully regulated power supply as indicated at 40 powering a voltage divider 41 which is used to incrementally energize meter movement 10 in accordance with position of a tap 42 which may be adjusted by a ratchet mechanism 43 powered one notch at a time by a solenoid 44 and reset (at the end of pointer 11 travel) by a mechanism not shown.

The essential principle involved in the operation of the invention centers around the permissibly continuous rotation of the drum 34 powered by any sort of synchronous or asynchronous motor and the geometrically determined fact that whenever there is a pulse of proper condition from photo tube 18, flash tube 22 will project a very brief flash at a very precisely determined position onto dial plate 26 and print the corresponding indicia. When the sensitive film has been exposed to one such mark the programming device will reposition the pointer of the meter movement (by repositioning the tap 42 of voltage divider 41) for the next exposure and reposition film strip 23 if necessary.

It should be observed that the present invention has a photo tube which does not control the mechanical positioning of anything, does not energize a servo mechanism, is only required to produce a pulse, and is only used for operating the flash tube to provide lumination for a single calibration mark and/or number. Advantages of this arrangement are speed, low initial cost of the dial plate printing apparatus, low maintenance cost, and, possibly even more important, much greater accuracy than heretofore possible because of the absence of any servo (feedback) mechanism characteristically having either a dead zone or some degree of hunting. There is thus provided apparatus of the class described capable of meeting the objects above set forth.

While there has been illustrated and described a particular embodiment, various modifications may obviously be made without departing from the true spirit and scope of the invention which is intended to be defined only by the appended claims taken with all reasonable equivalents.

By way of example, the photoelectric tube and the flash tube need not be located on opposite sides of an axis about which they rotate, for this photoelectric sensing means and photosensitive material exposing means may be located in any fixed position with respect to one another at least if the meter movement to be calibrated and the photosensitive material for producing a dial plate have a correspondingly spaced position with respect to one another. Either assembly can be rotatable (or even linearly movable) while the other is stationary, and for performing the various functions means quite different in appearance from those depicted might be used. Thus, for moving the preprinted film, instead of the rotating switch segment, programmer, slip rings and motor shown, a mechanical equivalent might consist of cams and rods, or could comprise a stationary ring gear engaged by a pinion on a shaft journalled to rotate with the drum (if there is a drum) and correspondingly position the pre-printed film 23.

It should be understood that the light source 22 is preferably a flash tube so that when triggered it does not stay on for any appreciable period of time and thus there is no smearing of the image (on 26) with continued rotation or other relative movement.

I claim:

1. In apparatus of the type having an electrical indicating meter movement which has a pointer, and having photoelectric means to scan at least a portion of the area of pointer travel and generate an electrical signal responsive to pointer position therein, and having remote from said meter a photosensitive material piece, and having a light source arranged to substantially impinge upon a portion of said photosensitive material piece responsive to said electrical signal to expose said piece to produce at least latent indicia thereon and thus a dial plate for the particular meter movement, and having an indicia bearing film interposed between said light source and said photosensitive piece and having means for amplifying the signal from the photoelectric means, the novel combination of means for moving the photoelectric means relative to the indicating meter movement, means for sensing relative movement between said photoelectric means and said meter movement, gate means arranged responsive to said means for sensing relative movement and for gating the amplified signal from the photoelectric means, trigger means arranged responsive to said gate means and for applying a pulse to flash said light source, the meter movement being generally stationary, the photoelectric means being movable, the photosensitive material piece being generally stationary, the light source being movable with the photoelectric means, and there being means for automatically moving the meter movement pointer according to relative movement of photoelectric means and light source with respect to meter movement and photosensitive material piece.

2. Apparatus as in claim 1 further characterized by the photoelectric means and the light source being located within a lens apertured drum rotatable about an axis, the means for moving said photoelectric means and light source comprising a motor arranged to rotate said drum, the meter movement and the photosensitive material piece being located outside of said drum while being arranged so that the meter movement pointer affects the photoelectric means and the light source affects the photosensitive material piece at different drum rotative positions for different positions of meter movement pointer.

3. Apparatus as in claim 1 further characterized by means for automatically moving the indicia bearing film with said relative movement.

4. Apparatus as in claim 2 further characterized by means including relatively stationary and rotatable parts for automatically advancing the meter movement pointer according to relative rotation of photoelectric means and light source with respect to meter movement and photosensitive material piece.

5. Apparatus as in claim 4 further characterized by means including relatively stationary and rotatable parts for automatically advancing and retracting the indicia bearing film with relative rotation.

References Cited by the Examiner

UNITED STATES PATENTS

| | | | |
|---|---|---|---|
| 2,746,833 | 5/1956 | Jackson | 346—1 X |
| 3,001,131 | 9/1961 | Oliver | 324—74 |
| 3,059,709 | 10/1962 | Karp. | |

WALTER L. CARLSON, *Primary Examiner.*